United States Patent [19]

Dallman

[11] Patent Number: 5,537,808
[45] Date of Patent: Jul. 23, 1996

[54] CONTROL ASSEMBLY FOR A BRUSH CUTTING MACHINE

[76] Inventor: Jammie J. Dallman, 3709 99th Dr. SE., Everett, Wash. 98205

[21] Appl. No.: 235,558

[22] Filed: Apr. 29, 1994

[51] Int. Cl.⁶ .................................................. A01D 34/00
[52] U.S. Cl. ............................................................ 56/15.2
[58] Field of Search .................................. 56/14.5, 14.7, 56/14.9, 15.1–15.3, 15.5, 17.1

[56] References Cited

U.S. PATENT DOCUMENTS

| 4,912,916 | 4/1990 | Parsons, Jr. | 56/15.2 |
|---|---|---|---|
| 4,956,965 | 9/1990 | Parsons, Jr. | 56/15.2 X |
| 4,996,830 | 3/1991 | Davison | 56/15.2 X |

*Primary Examiner*—Michael Powell Buiz
*Attorney, Agent, or Firm*—Donna J. Thies

[57] ABSTRACT

A control assembly for a brush cutting machine. The control assembly is attached at its top to the distal end of the dipper boom of a cutting machine and at its bottom is attached to the blade assembly of a cutting machine, The control assembly comprises a rotatory in the form of an upper and lower plates which rotate together relative to the boom of a cutting machine thereby causing the blade assembly to rotate into a forward facing position into the material to be cut. The control assembly further comprises an adjuster in the form of a plurality of coil springs positioned between the upper and lower plates of the rotatory which serves to adjust the vertical movement of the blade assembly relative to the ground, A center mounting member mounts the bottom of the control assembly to the center of the top of the blade assembly for efficient control of the movements of the blade assembly, A combination angling and attaching portion swivels the control assembly to thereby adjust the angle of the blade assembly relative to the ground and attaches the control assembly to the brush cutting machine, A quick attachment in the form of a plate in rotatable engagement with a mating securing receiver integral with the lower surface of the bottom of the rotatory attaches the control assembly to the blade assembly. A method for controlling the movement of a blade assembly of a brush cutting machine is also disclosed.

20 Claims, 7 Drawing Sheets

CONTROL ASSEMBLY FOR A BRUSH CUTTING MACHINE

BACKGROUND OF THE INVENTION

In conventional brush cutting technology, the boom of a standard brush cutting machine is located either to the side or the front of the cutting machine. A standard boom consists of two booms which appear as two arms of one boom. The first arm is located closest to the cutting machine and is fixedly attached thereto. The second arm is attached to the first arm and is called the dipper boom. In prior art blade assemblies for a brush cutting machine the blade is positioned at the distal end of the dipper boom. A conventional blade assembly is covered by a sheath which has an opening on its forward facing side. As the blades rotate the brush in front of the opening is cut. If the boom is turned the opening in the sheath moves, thus the blades opening would move away from the brush to be cut thereby cutting a narrower area. If the boom was rotated 90 degrees forwardly, the opening in the sheath would move such that the side of the sheath would replace the opening and the opening would move completely away from the brush and there would be no brush cut. In the prior art, the blade therefore can only be positioned at the side of the machine when cutting brush. So, in order to position the blade so that it is forward facing into the material to be cut, the prior art requires the physical movement of the machine to move the blade so that it will be presented in a proper cutting position to cut brush. It can be seen that this is a very labor intensive operation requiring much maneuvering by the operator and considerable fuel consumption by the cutting machine with the required movement of the machine.

Further, in the prior art, with the blade assembly attached directly to the distal end of the dipper boom, the blade assembly is rigid and flat against a ground surface that is most often not flat. It can be seen therefore, that in the prior art as the blade assembly moves evenly across the brush and the uneven ground that there will be an uneven cut of the brush, higher where there are depressions in the ground and lower where there is a raised area in the ground. Also, as the conventional rigid blade assembly strikes raised earth or large rocks there will be an abrupt jolt to the blade assembly and consequently to the cutting machine and machine operator.

U.S. Pat. No. 3,824,674 to Inoyama et al discloses an automatic assembly control for controlling a positioning mechanism in response to signals representative of the displacement or deflection of an elastic coupling means.

U.S. Pat. No. 4,414,750 to DeFazio discloses a remote center compliance device having two plates with elements interposed between, each element being axially compressible and laterally deformable.

U.S. Pat. No. 4,848,757 to DeFazio discloses a remote center compliance device having two plates with coil springs interposed there between for providing rotational and translational compliance.

SUMMARY OF THE INVENTION

In order to overcome problems inherent in the prior art there has been provided by the present rotating, floating and quick attaching control assembly an improvement in the general brush cutting operation. The rotating, floating and quick attaching control assembly of the present invention is located at the distal end of the second or dipper boom and is positioned between the dipper boom and the blade assembly. The control assembly of the present invention is used to control and attach a variety of blade assemblies such as a flail cutter, rotary blade assembly, etc. to the boom of a brush cutting machine. In this regard, the control assembly of the present invention functions as a coupling means serving to connect the blade assembly to the dipper boom of the cutting machine. The control assembly of the present invention includes a center mounting member for attaching the control assembly to the center of the blade assembly. The center mounting member serves to lift the blade assembly over rocks and debris and makes the control assembly more efficient by centering the control functions, the rotating and swiveling adjustment of the blade assembly, over the mechanism to be controlled. The control assembly of the present invention rotates at substantially 180 degrees allowing the control assembly to be rotated in the opposing direction of the boom thereby maintaining a forward facing cutter or blade position such that the blade is facing into the material to be cut. This is a substantial advantage over the prior art which only allows the blade to be at the side of the cutting machine. The rotating, floating control assembly of the present invention includes an upper rotation plate and a lower rotation plate having a plurality of coil springs therebetween. The upper and lower plates comprise the rotating means of the present invention. These two plates rotate together in the same direction around a 180 degree semicircular path at the distal end of the dipper boom. The rotating means of the present invention is caused to rotate by a hydraulic cylinder system but can be rotated by any suitable means. The coil springs comprise the adjusting means of the present invention and serve to adjust the vertical movement of blade assembly relative to the ground. The object of the springs is to change short abrupt jolts received from depressions and high spots on the ground into softer, smoother movements received by the brush cutting machine, to reduce wear and tear on the machine and the operator. In addition, the springs of the rotating, floating control assembly allow the blade of the brush cutting machine to follow the lay of the ground. This is particularly useful on uneven ground where most of the brush to be cut would be growing. There is thereby a closer cut of the brush and less stress on the machine and operator. The control assembly of the present invention also includes a combination angling and attaching means which allows the swiveling and angular movement of the control assembly to thereby control the swiveling and angular movement of the blade assembly. As an attaching means, the combination angling and attaching means serves as the center shaft member which holds the rotating and adjusting means together. The first angling end of the combination angling and attaching means includes a first right and second left generally semicircular plates having mating holes positioned therethrough for receiving a pin. The pin is positioned through the mating holes in the semicircular plates of the first angling end of the combination angling and attaching means and through a swiveling means thereby attaching the swiveling means between the first right and second left semicircular plates of the angling end of the combination angling and attaching means. The angling end of the combination angling and attaching means also comprises the swiveling means which is a generally ball shaped member and is attached to the lower rotation plate of the control assembly. The second shaft and attaching end of the combination angling and attaching means extends upward from the swiveling means, through the lower and upper surfaces of the upper rotation plate of the control assembly, through a first thrust bearing, the bushing which is attached to the dipper boom, and through a second thrust bearing whereupon it is secured with a bolted nut. The control assembly of the present invention also has a unique quick attachment means which is used to release and attach the rotating, floating control assembly to the dipper boom and to the blade assembly. The attachment means of the present invention includes a securing member which is attached to the top of the blade assembly. The bottom of the control assembly is configured to be in mating attachment with the securing member. The pins which are part of the attachment means are used to attach the bushing which is part of the top of the control assembly to the distal end of the dipper boom. The bottom surface of the lower rotation plate of the rotating, floating control assembly is positioned over the securing member and a centering pin on the bottom surface of the lower rotation plate of the control assembly is inserted into a centering hole in the securing member. Two straight sides on the securing member are configured to line up with two corresponding lines on the bottom surface of the lower rotation plate of the control assembly. When the rotating, floating control assembly and the securing member are joined together, the rotating means and consequently the lower rotation plate of the bottom of the control assembly is rotated 90 degrees in either direction thereby locking the securing member and the bottom of the control assembly together. This 90 degree rotation to lock the securing member and the bottom of the control assembly together is accomplished by the same hydraulic cylinder system which rotates the rotating means but can also be accomplished by other suitable means. The two securing pins are then inserted into any two of the securing holes, which are through both the lower rotation plate and the securing member.

It is therefore an object and advantage of the present invention to provide a rotating, floating control assembly for a brush cutting machine that allows the blade to follow the lay of the ground where brush is to be cut providing a closer cut of the brush.

It is another object and advantage of the present invention to provide a rotating, floating control assembly for a brush cutting machine that allows an improved cut of brush with less stress imposed on the machine and the operator.

It is yet another object and advantage of the present invention to provide a rotating, floating control assembly for a brush cutting machine that allows a forward facing blade to be positioned into the material to be cut without movement of the brush cutting machine.

It is still yet another object and advantage of the present invention to provide a combination angling and attaching means for the control assembly which allows for the vertical and angular movement of the control assembly and hence the vertical and angular movement of the blade assembly.

It is still yet another object and advantage of the present invention to provide a center mount on the blade assembly for the rotating, floating control assembly for a brush cutting machine so that as the control assembly moves over rocks and debris, the movement of the blade assembly is controlled in an efficient manner.

It is still yet another object and advantage of the present invention to provide a quick attachment means for attaching the rotating, floating control assembly to the blade assembly and to the boom of a cutting machine thereby reducing time and expense in a brush cutting operation and increasing convenience for the operator.

These and other objects and advantages of the present invention will become apparent after a thorough review of the following specification and drawings.

DESCRIPTION OF THE PREFERRED EMBODIMENT

Figure 1:
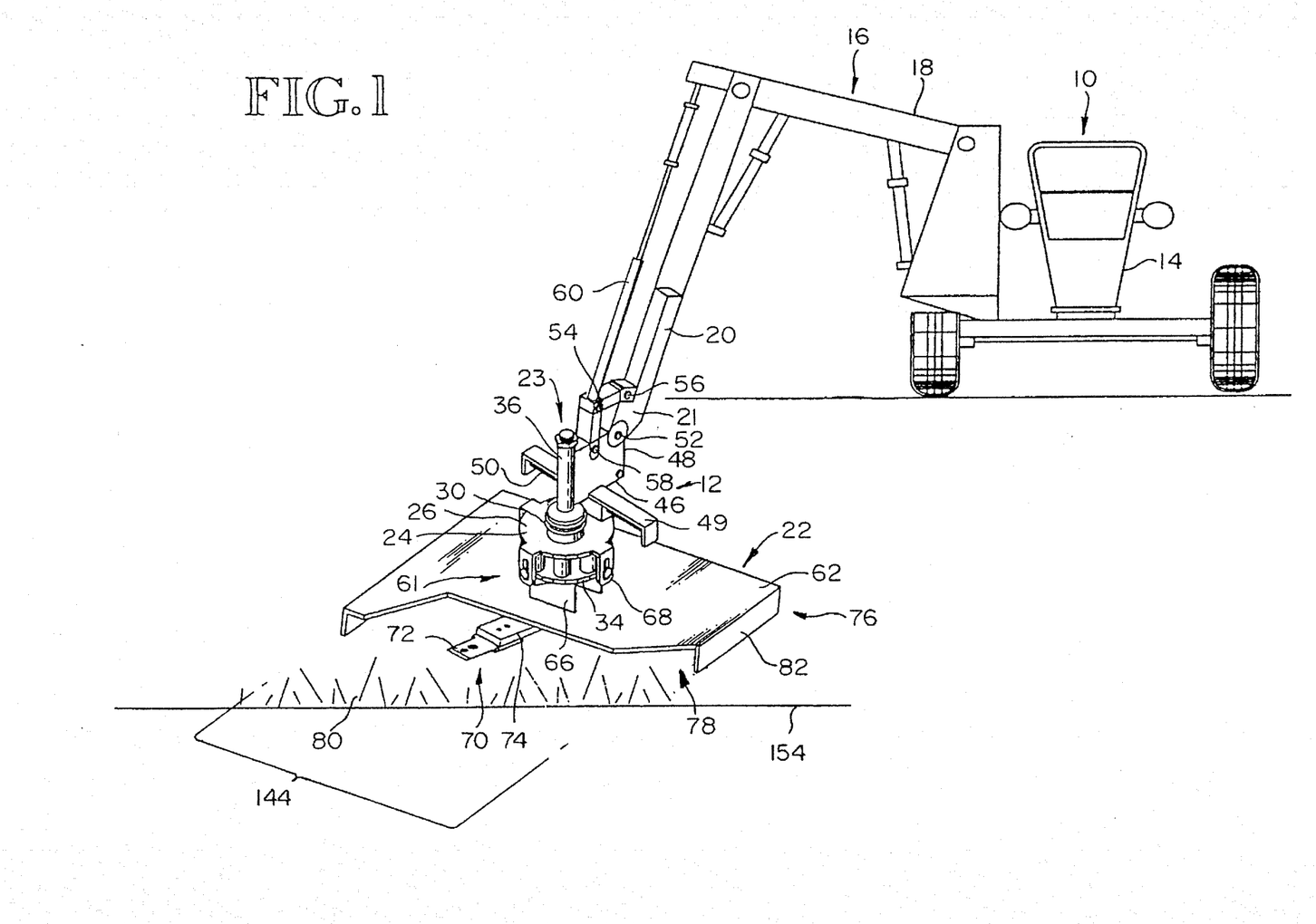
FIG. 1 is a front perspective view showing the control assembly of the present invention positioned on a brush cutting machine and used to control the movements of a conventional blade assembly.
Figure 4:
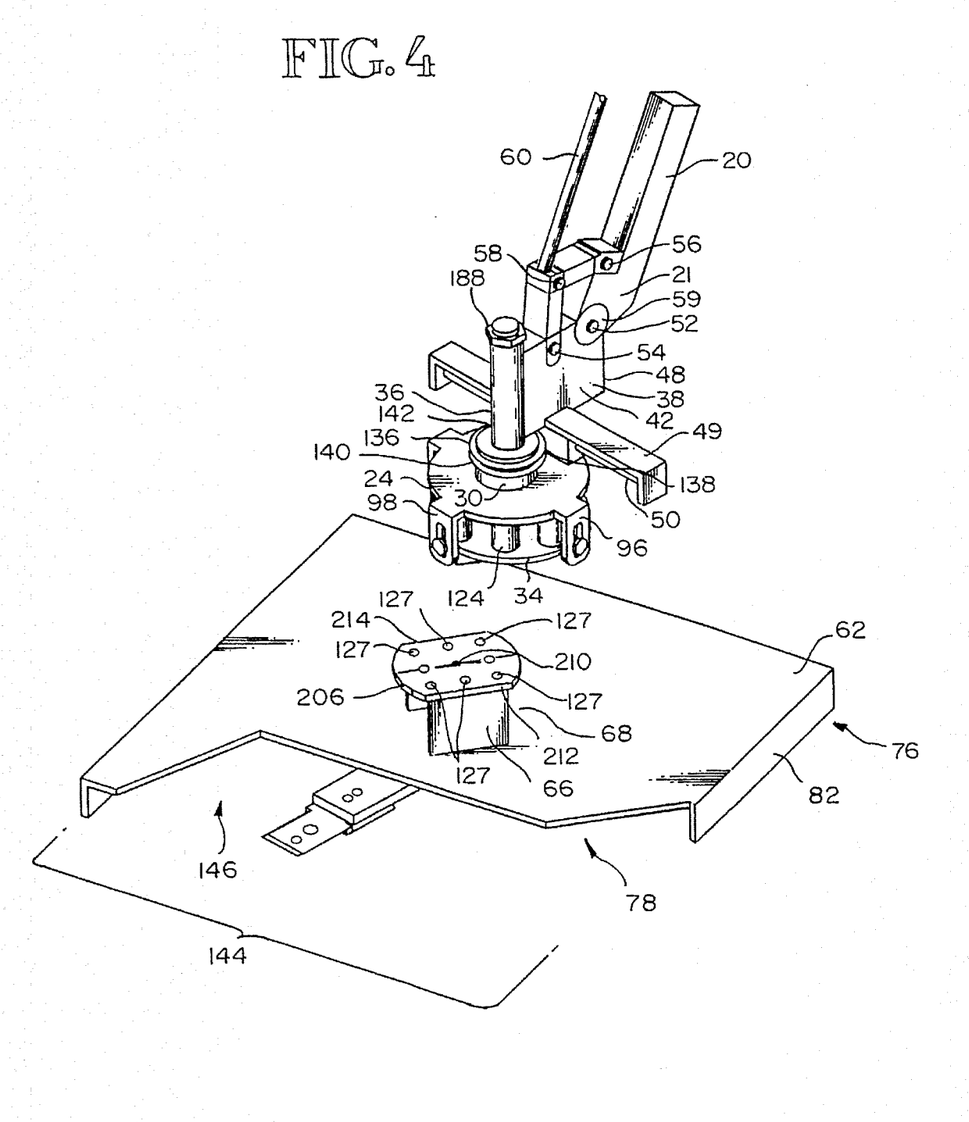
FIG. 4 is a top perspective view showing the control assembly of the present invention in greater detail. The control assembly being used with the improved blade assembly of FIG. 2.
Figure 5:
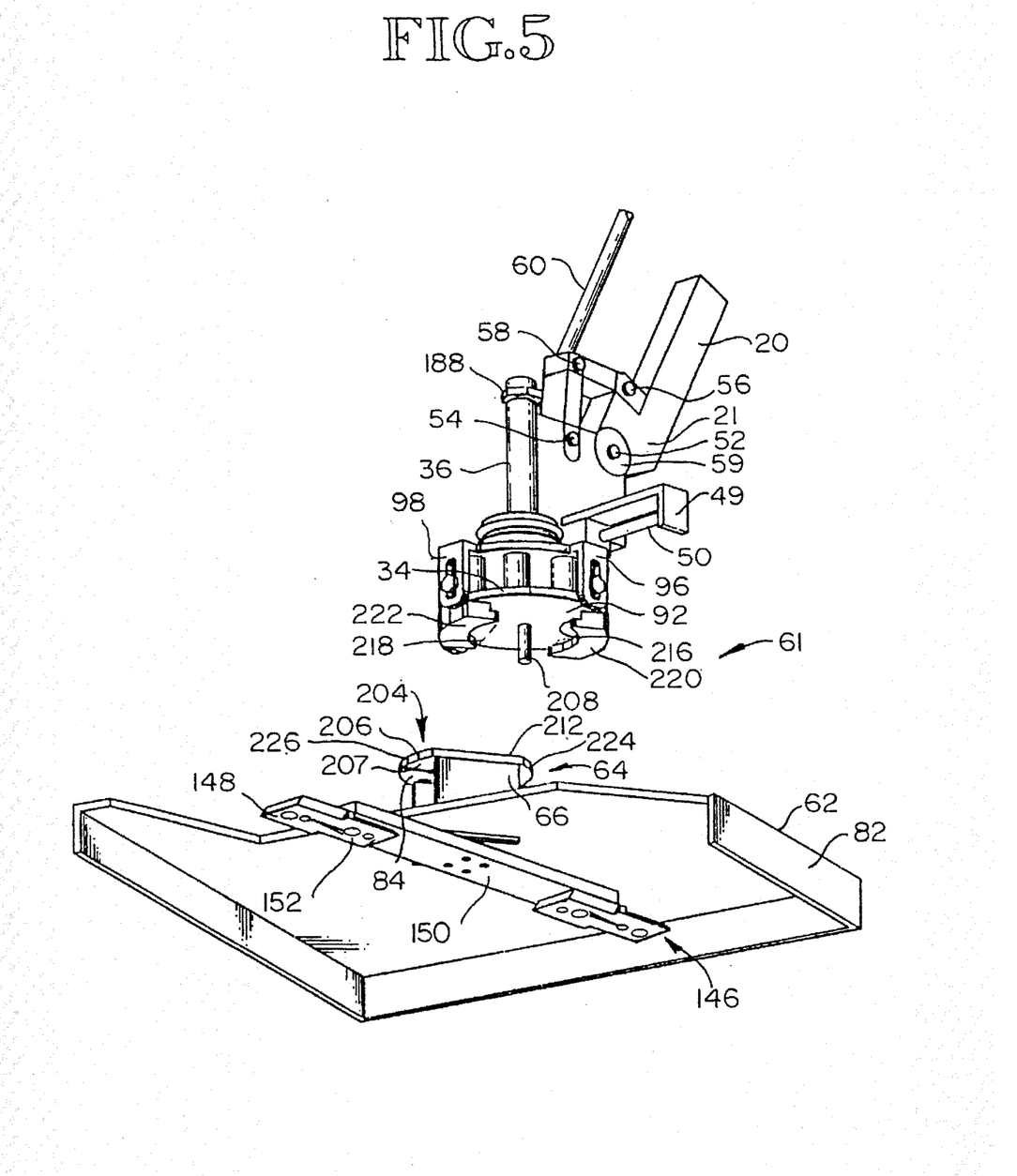
FIG. 5, the control assembly being used with the improved blade assembly of FIGS. 2 and 4 is a bottom perspective view showing the control assembly of the present invention in greater detail, and showing the quick attachment feature of the present control assembly.

Referring now to the drawings in general and in particular to FIG. 1 of the drawings there is shown a front perspective view of the present rotating, floating and quick attaching control assembly for a brush cutting machine shown as it is positioned on a brush cutting machine and used to control the movements of a conventional blade assembly. In FIG. 1 the brush cutting machine is shown generally by the number 10 and the rotating, floating control assembly is shown generally by the number 12. In FIG. 1 it can be seen that extending from the side 14 of the brush cutting machine 10 is a boom 16 having two arms 18 and 20. The first arm 18 of the boom 16 is located closest to the cutting machine 10 and is attached to the side 14 of the cutting machine 10. The second arm 20 of the boom 16 is attached to the first arm 18 and is referred to as the dipper boom. Positioned between the distal end 21 of the dipper boom 20 and the blade assembly 22 of the cutting machine 10 is the control assembly 12 of the present invention. At the top 23 of the control assembly 12 there is an upper rotation plate 24 having an upper surface 26 and a lower surface 28 as seen most clearly in FIG. 3. A tower 30 is welded to the upper surface 26 of the upper rotation plate 24. Extending upward from the tower 30 is a center shaft member 32 which holds the upper rotation plate 24 and the lower rotation plate 34 together. Two plates 38 and 40 comprise the two sides 42 and 44 of the bushing 40 as seen most clearly in FIG. 6. Positioned over the center shaft member 32 is the cylindrical part 36 of the bushing 46, the two sides 42 and 44 of the bushing 46 are attached together at the rear 48 of the bushing 46. Attached below the bushing 46 is the hydraulic cylinder housing 49 which holds the hydraulic cylinder 50 that causes the control assembly 12 to rotate. The two sides 42 and 44 of the bushing 46 positioned at the top of the control assembly 12 are attached to the distal end 21 of the dipper boom 20 with two securing pins 52 and 54. Two other pins 56 and 58 serve as pins through a hinge 59 as seen most clearly in FIG. 6. The hinge 59 provides bending action for the control assembly 12 relative to the dipper boom 20. The top 23 of the control assembly 12 generally comprises the upper rotation plate 24 and everything above it up to the dipper boom 20. Above the top 23 of the control assembly 12 is a conventional hydraulic cylinder 60 that is mounted on the dipper boom 20 and causes the dipper boom 20 to dip. At the bottom 61 of the control assembly 12 is the lower rotation plate 34 which is attached to the top 62 of the blade assembly 22 by an attachment means 64 as will be described in greater detail hereinafter, the bottom 61 of the control assembly 12 thereby generally comprising the lower rotation plate 34 and everything below it to the top 62 of the blade assembly 22. In the preferred embodiment of the present invention, the control assembly 12 includes a center mounting member 66 for attaching the control assembly 12 to the center 68 of the top 62 of the blade assembly 22 as seen in FIG. 4. In FIG. 1, the bottom 61 of the control assembly 12 is shown attached by the center mounting member 66 to the center 68 of the top 62 of a conventional blade assembly 22. The control assembly 12 of the present invention can be used with numerous conventional blade assemblies, such as a flail cutter and others. For purposes of illustration the control assembly 12 will be described used with a conventional rotary blade assembly. A conventional blade assembly 22 generally includes a blade or cutting portion 70 generally having two identical blades 72, a crossbar 74, and a sheath 76 positioned over the blade or cutting portion 70 of the blade assembly 22, the sheath 76 having a forward facing opening 78 with the blades 72 rotating out of the opening 78 to cut brush 80 in front of the opening 78, the sheath 76 thereby forming the top 62 and sides 82 of the blade assembly 22. The center mounting member 66 in the form of a generally U shaped bracket is secured to the center 68 of the top 62 of the sheath 76 forming the top 62 of the blade assembly 22. It is seen in FIG. 1 that the control assembly 12 of the present invention is used with a conventional blade assembly 22, the only adaptation being required to use the control assembly 12 with a conventional blade assembly 22 is that the center mounting member 66 be attached to the center 68 of the top 62 of the sheath 76. This generally inverted U shaped bracket 66 is positioned under the attachment means 64 which attaches the control assembly 12 to the blade assembly 22 and is positioned on the top 62 of the blade assembly 22 as seen most clearly in FIG. 5. As seen in FIGS. 5 and 7, the upper portion 84 of the inverted U shaped bracket or center mounting member 66 is sloped downwardly toward the leading edge end 86 of the blade assembly 22 as seen most clearly in FIG. 7. This downward sloping of the upper portion 84 of the center mounting member 66 causes a constant counter lifting condition on the leading edge end 86 of the blade assembly 22. This lifting ensures that as the leading edge end 86 of the blade assembly 22 encounters rocks 88, debris or the like that it will lift gently over the top of these obstacles while still presenting the cutting blades 72 of the blade or cutting portion 70 of the blade assembly 22 forwardly to the brush 80 around them as shown most clearly in FIGS. 1 and 7. Further, the specific control functions afforded by the present control assembly 12, i.e. rotating, and vertical swiveling or angular adjustment of the blade assembly 22, are accomplished more efficiently with the use of the center mounting member 66 as movements and adjustments start at the center 68 of the blade assembly 22 and move outwardly allowing finer movements to accomplish the various control adjustments.

Figure 3:
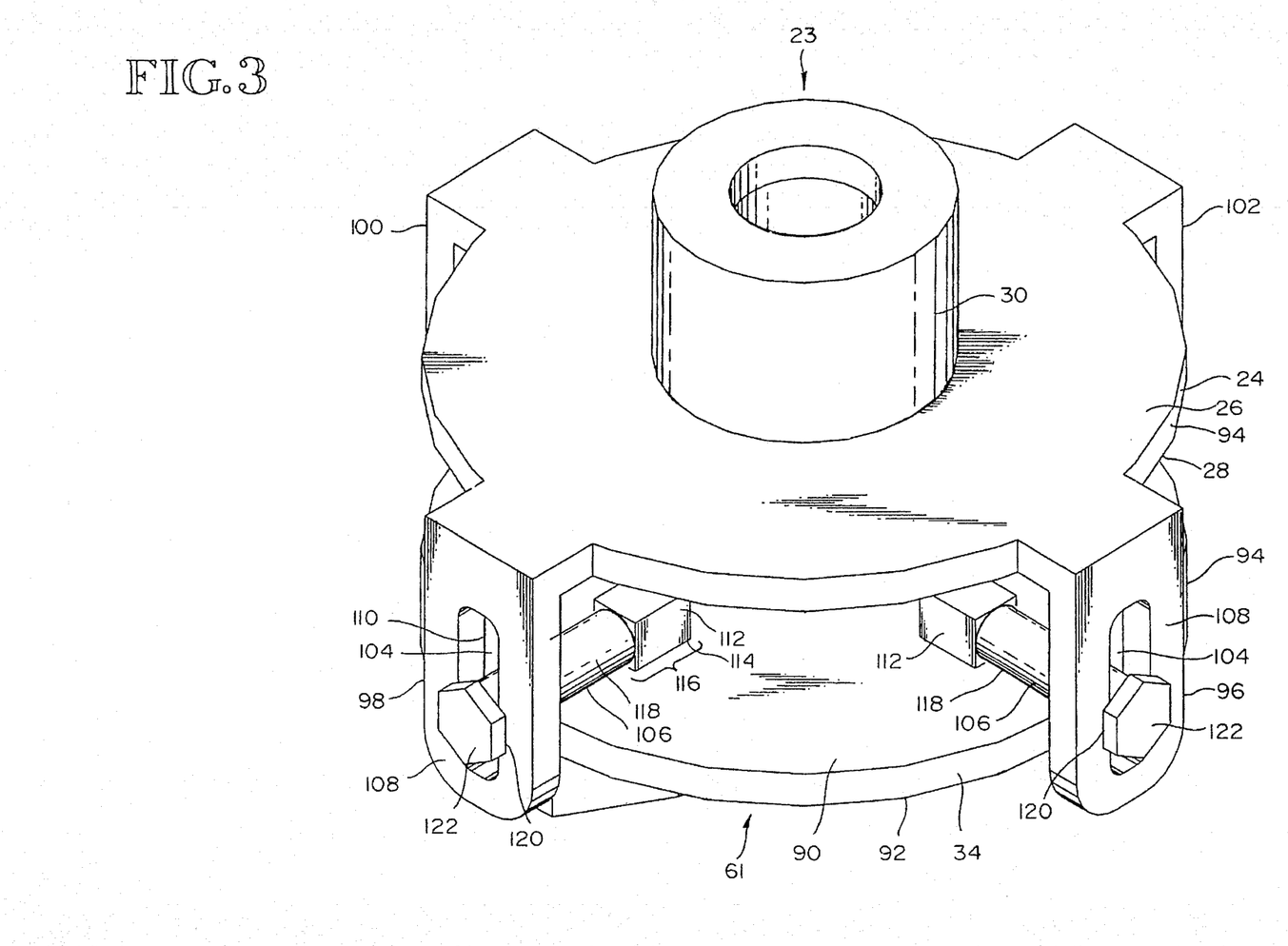
FIG. 3 is an enlarged perspective view showing the attachment of the upper and lower rotation plates of the present control assembly in greater detail.

FIG. 3 is an enlarged perspective view showing the attachment of the upper and lower rotation plates of the control assembly of the present invention in greater detail. As seen in FIG. 3, the rotating, floating control assembly 12 comprises generally an upper rotation plate 24 which is part of the top 23 of the control assembly 12, the upper rotation plate 24 having an upper surface 26 and a lower surface 28. A lower rotation plate 34 which is part of the bottom 61 of the control assembly 12 also has an upper surface 90 and a lower surface 92. This upper rotation plate 24 and lower rotation plate 34 generally comprise the rotating means 94 of the present control assembly 12. The upper rotation plate 24 of the rotating means 94 is attached to the lower rotation plate 34 of the rotating means 94 by means of four winged tabs 96, 98, 100, and 102 that extend from the upper surface 26 of the upper rotation plate 24 and form a right angle to extend past the lower rotation plate 34. Each winged tab 96, 98, 100 and 102 has a slot 104 for positioning a bolt 106 therethrough. Each bolt 106 is positioned through each slot 104 in each winged tab 96, 98, 100 and 102 at the outer surface 108 of the winged tabs 96, 98, 100 and 102. At the inner surface 110 of each winged tab 96, 98, 100 and 102 each of the bolts 106 is secured with a combination mating nut and stop, each combination mating nut and stop 112 in turn is attached at its lower surface 114 for the entire length 116 of the combination mating nut and stop 112 to the upper surface 90 of the lower rotation plate 34 of the control assembly 12. The winged tab 96 with the bolt 106 is an example of how all the winged tabs 96, 98, 100 and 102 with all four bolts 106 are attached. As the bolt 106 is positioned through the outer surface 108 of the winged tab 96 and into engagement with the corresponding combination mating nut and stop 112 serves to stop the screw end 118 of the bolt 106 so that the bottom surface 120 of the bolt head 122 remains flush with the outer surface 108 of the winged tab 96.

FIG. 4 if a top perspective view showing the control assembly of the present invention in greater detail. In the preferred embodiment of the present invention, there are a plurality of coil springs 124 positioned between the upper rotation plate 24 and the lower rotation plate 34 of the control assembly 12. The upper 24 and lower 34 rotation plates comprise the rotating means 94 and the plurality of coil springs 124 generally comprise the adjusting means 126 of the control assembly 12 as seen most clearly in FIG. 6. Each coil spring 124 is secured to the upper surface 90 of the lower rotation plate 34 by a spring retainer 125, the spring retainers 125 each being positioned around a securing hole 127 used as part of the attachment means 64 as will be described hereinafter with reference to FIG. 5. In general, in the preferred embodiment of the present invention, and as seen most clearly in FIG. 6, the two rotation plates 24 and 34 are caused to rotate together in the same direction by the hydraulic cylinder 50 or control means 128. The cylinder 50 of the control means 128 is encased in a metal housing 49, the bottom 130 of the metal housing 49 is welded to the upper surface 26 of the upper rotation plate 24. The top 132 of the metal housing 49 is fixedly attached to the lower surfaces 134 of the plates 38 and 40 that form the sides 42 and 44 of the bushing 46 that is in turn attached to the distal end 21 of the dipper boom 20. This cylinder 50 has a first chain 136 attached to the first end 138 of the horizontal hydraulic cylinder 50, and a second chain 140 attached to the second end 142 of the horizontal hydraulic cylinder 50. The chains 136 and 140 are attached to the tubular tower 30 which extends upwardly from the upper rotation plate 24 of the control assembly 12. The first chain 136 is wrapped in a clockwise direction around the tower 30, and the second chain 140 is wrapped in a counter-clockwise direction around the tower 30. When the horizontal hydraulic cylinder 50 is extended in either the clockwise or counter-clockwise direction, the upper 24 and lower 34 rotation plates are rotated in the same direction. The rotation of the upper rotation plate 24 and the lower rotation plate 34 that comprise the rotating means 94 cause the blade assembly 22 to rotate in the same direction. In the preferred embodiment then, the two rotation plates 24 and 34 are caused to rotate together in the same direction by the hydraulic cylinder 50 or control means 128 positioned on the control assembly 12 just behind the tower 30 and attached to the upper surface 26 of the upper rotation plate 24 of the rotating means 94, but it is to be understood that other suitable methods of causing rotation of the rotating means 94 of the present invention are within the spirit and scope of the invention. As seen in FIG. 1 and in more detail in FIGS. 4 and 6, the upper surface 26 of the upper rotation plate 24 is attached to the tower 30, the tower 30 is attached to the center shaft member 32 which extends from the lower rotation plate 34 up through the upper rotation plate 24, and through the tower 30. The center shaft member 32 attaches to both sides 42 and 44 of the bushing 46 which in turn attach to the distal end 21 of the dipper boom 20. The lower surface 92 of the lower rotation plate 34 is releasibly attached to the top 62 of a blade assembly 22. As described hereinbefore, the control assembly 12 of the present invention is shown used with a conventional blade assembly 22 in FIG. 1.

In operation of the preferred embodiment, the rotating, floating control assembly 12 rotates at plus or minus 180 degrees allowing the control assembly 12 to be rotated in the opposing direction of the boom 16 thereby maintaining a forward facing cutting position 144 so that the blade assembly 22 and hence the blades 72 are facing into the brush 80 to be cut. It is however, within the spirit and scope of the present invention to rotate the control assembly 12 around an entire 360 degree or less radius. Conventional blade assemblies 22 are covered by a sheath 76 having an opening 78. As the blades 72 rotate, the brush 80 in front of the opening 78 is cut. If the boom 16 is turned, the opening 78 in the sheath 76 moves, thus the opening 78 would move away from the brush 80 to be cut thereby cutting a narrower area. If the boom 16 was rotated 90 degrees forwardly, the opening 78 in the sheath 76 would move such that the side 82 of the sheath 76 would replace the opening 78 and the opening 78 would move completely away from the brush 80 and there would be no brush 80 cut. Therefore, prior art blade assemblies positioned at the distal end 21 of the dipper boom 20 allow the blade assembly 22 to only be positioned at the side 14 of the cutting machine 10. It can be seen therefore that in order to position the blade assembly 22 so that it is forward facing into the material to be cut, the prior art requires the physical movement of the cutting machine 10 to move the blade assembly 22.

Figure 2:
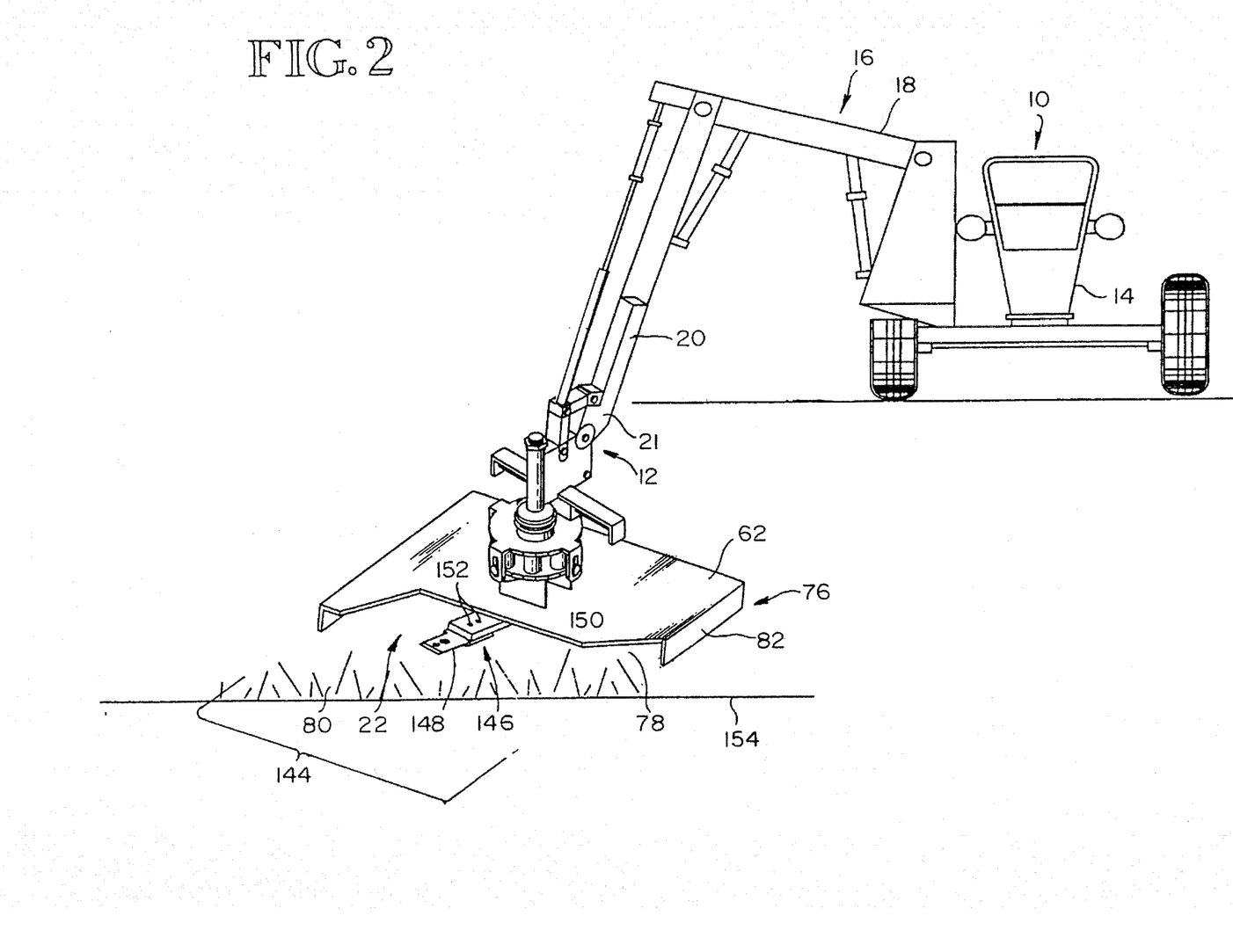
FIG. 2 is a front perspective view showing the control assembly of the present invention positioned on a brush cutting machine and used with an improved blade assembly as described in the co-pending application entitled A Blade Assembly for a Brush Cutting Machine.

FIG. 2 is a front perspective view showing the control assembly of the present invention positioned on a brush cutting machine 10 and used with the improved blade assembly 146 as described in the co-pending application entitled A Blade Assembly for a Brush Cutting Machine. As seen in FIG. 2 and in FIG. 5, the control assembly 12 of the present invention can also be used with this improved blade assembly 146 generally including two identical improved blades 148, a crossbar 150 and attachment means 152 for attaching the blades 148 to the crossbar 150 with no changes to its operation as described hereinbefore or after. In the present application then, descriptions relating to the use of the conventional blade assembly 22 are interchangeable with descriptions relating to the use of the improved blade assembly 146 and vice versa.

FIG. 5 is a bottom perspective view showing the control assembly of the present invention in greater detail. As described previously, the rotating, floating control assembly 12 of the present invention generally includes an upper rotation plate 24 and a lower rotation plate 34 comprising the rotating means 94 and a plurality of coil springs 124 therebetween. The coil springs 124 comprise the adjusting means 126 of the control assembly 12 and adjust the vertical movement of the blade assembly 22 relative to the ground 154 and brush 80 as seen most clearly in FIG. 7. The coil springs 124 thereby act as shock absorbers and change short abrupt jolts received by the blade assembly 22 as it strikes uneven ground into softer, smoother movements as received by the brush cutting machine 10, thus reducing stress on the brush cutting machine 10 and the operator. This plurality of coil springs 124 that comprise the adjusting means 126, positioned between the upper rotation plate 24 and the lower rotation plate 34 that comprise the rotating means 94 serve to allow adjustment of the position of the blade assembly 22 and hence the blades 72 relative to the ground 154 in a longitudinal plane that extends around the entire circumference of the upper 24 and lower 34 rotation plates. It can be seen therefore, that the control assembly 12 of the present invention allows very fine adjustment of the blade 72 position relative to the ground 154 such that adaptations are made to the position of the blade assembly 22 and hence to the blades 72 through use of the present control assembly 12 for very minor changes in the ground 154 being covered. With the plurality of coil springs 124 used in the present invention these adjustments are made in quick response to the up and down movement of the blade assembly 22 across the ground 154.

Figure 6:
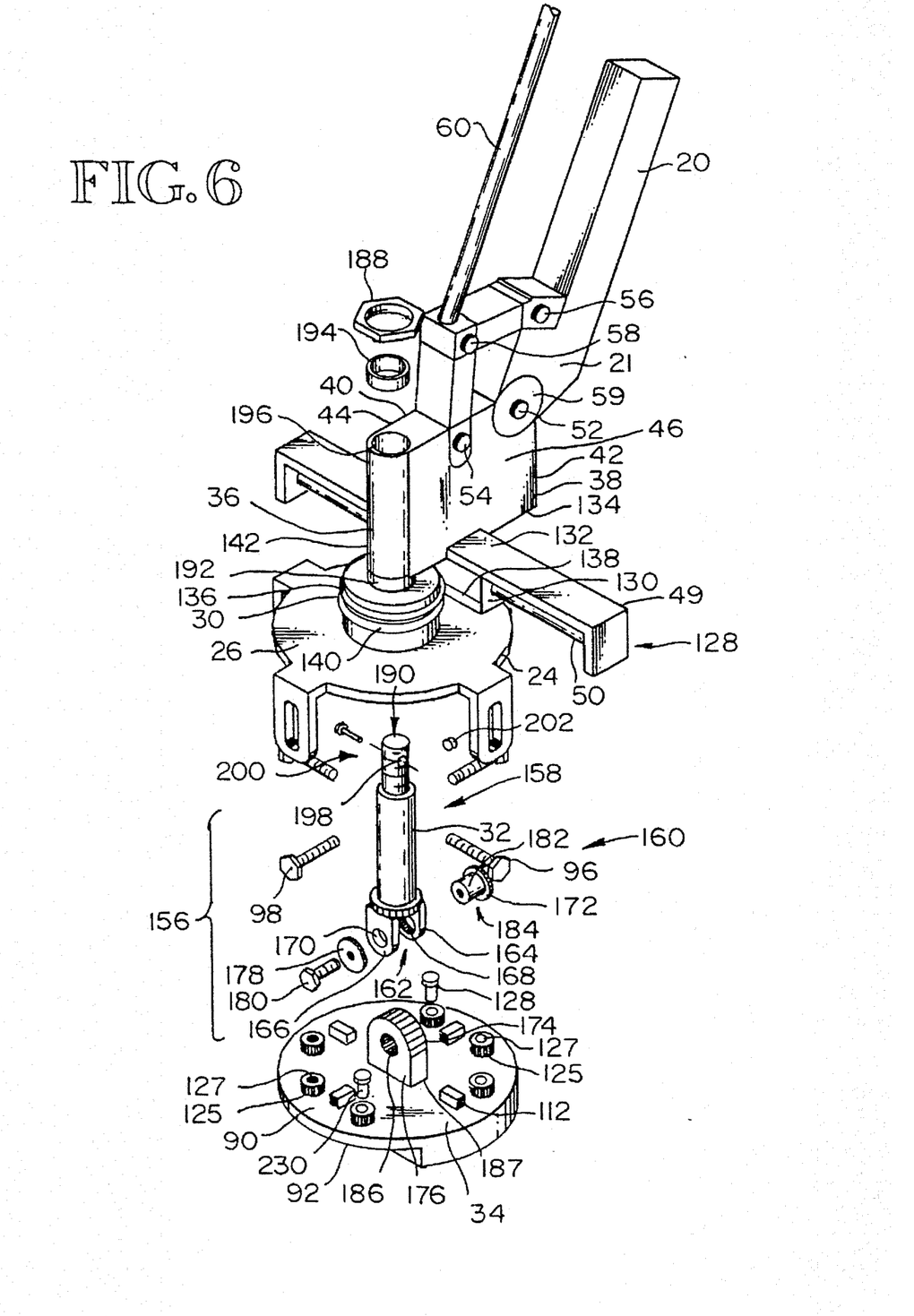
FIG. 6 is an exploded perspective view showing the combination angling and attaching means of the present control assembly in greater detail.
Figure 7:
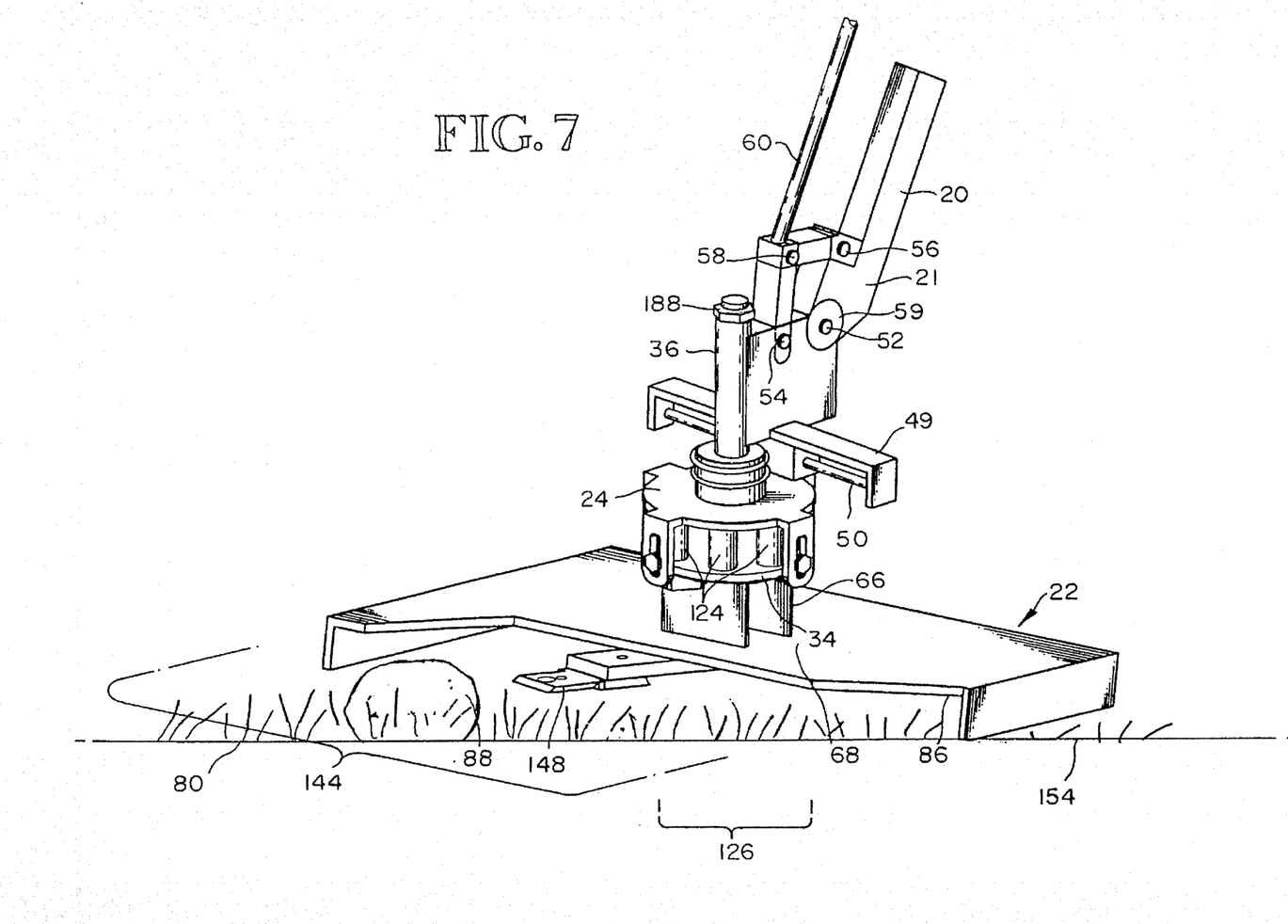
FIG. 7 is a perspective view of the present control assembly showing the center mounting member which mounts the control assembly over the center of the blade assembly as showing how the center mounting member lifts the blade assembly over rocks and debris.

Referring now to FIG. 6 of the drawings there is shown an exploded perspective view showing the combination angling and attaching means of the present control assembly in greater detail. The combination angling and attaching means 156 allows the swiveling and angular movement of the control assembly 12 to thereby control the swiveling and angular movement of the blade assembly 22. As an attaching means 158, the combination angling and attaching means 156 serves as the center shaft member 32 which holds the rotating means 94 and adjusting means 126 together. The angling means 160 positioned at the first angling end 162 of the combination angling and attaching means 156 comprises a first right plate 164 and a second left plate 166 which are generally semicircular plates with mating holes 168 and 170 positioned therethrough for receiving a bolt 172. The bolt 172 is positioned through the mating hole 168 in the first right plate 164 of the combination angling and attaching means 156, through a swiveling means 174, and through the mating hole 170 in the second left plate 166 to thereby attach the swiveling means 174 between the first right 164 and the second left 166 semicircular plates of the angling end 162 of the combination angling and attaching means 156. The angling means 160 of the combination angling and attaching means 156 also comprises the swiveling means 174 which is a generally ball shaped member 176, a washer 178 to the left of the second left plate 162, and a mating hollow threaded pin 180 to the left of the washer 178. The threaded bolt 172 goes through the washer 178, and into the hollow threaded pin 180, the washer 178 serving to secure the threaded pin 180 in the holes 168 and 170 of the semicircular plates 164 and 166. The hollow threaded pin 180 has a threaded diameter hole that receives the screw end 182 of the bolt 172 to allow the ball shaped member 176 to swivel on the axis formed by the body 184 of the bolt 172 through the center 186 of the swiveling means 174. The swiveling means 174 is attached at its lower surface 187 to the upper surface 90 of the lower rotation plate 34 of the control assembly 12. In operation, the ball shaped member 176 swivels in between the two left and right plates 164 and 166 in a similar fashion to a universal joint to provide angular adjustment of the control assembly 12 and consequently of the blade assembly 22. The attaching means 158 of the combination angling and attaching means 156 generally comprises the center shaft member 32 and a bolted nut 188. The attaching means 158 is positioned on the second shaft and attaching end 190 of the combination angling and attaching means 156. The center shaft member 32 extends upward from the swiveling means 174, through the lower 28 and upper 26 surfaces of the upper rotation plate 24 of the control assembly 12, through a first thrust bearing 192, the bushing 46 attached to the dipper boom 20, and through a second thrust bearing 194. The top 196 of the center shaft member 32 is secured with the bolted nut 188. Positioned through the top 196 of the center shaft member 32 is a hole 198 with a bolt 200 therethrough secured with a corresponding nut 202 which acts as a stop for the bolted nut 188 so that the bolted nut 188 does not back off the top 196 of the center shaft member 32 in operation.

FIG. 5 of the drawings is a bottom perspective view showing the control assembly of the present invention in greater detail and showing the quick attachment means of the present control assembly. In FIG. 5 it can be seen that the lower surface 92 of the lower rotation plate 34 of the control assembly 12 is positioned over a securing means 204 in the form of a plate 206, the lower surface 207 of the plate 206 being integral with the upper portion 84 of the center mounting member 66 which is fixedly attached to the top 62 of the center 68 of the blade assembly 22. Since the securing means plate 206 is fixedly attached to the upper portion 84 of the center mounting member 66, the securing means plate 206 will slope downwardly during operation as the center mounting member 66 lifts the leading edge end 86 of the blade assembly 22 over rocks 88 and debris as described with reference to FIG. 7. A centering pin 208 on the lower surface 92 of the lower rotation plate 34 of the control assembly 12 is inserted into a centering hole 210 in the securing means plate 206 as seen most clearly in FIG. 4. The two straight sides 212 and 214 of the securing means plate 206 line up with the two straight lines 216 and 218 shown in phantom on the lower rotation plate 34 of the control assembly 12. When the lower surface 92 of the lower rotation plate 34 of the rotating control assembly 12 and the securing means plate 206 are joined together, the rotating control assembly 12 is rotated 90 degrees in either direction thereby locking the curved members 220 and 222 of the attachment means 64 on the lower rotation plate 34 of the rotating control assembly 12 and the curved edges 224 and 226 of the securing means plate 206 together. Two securing pins 228 and 230 at the upper surface 90 of the lower rotation plate 34 of the control assembly 12 are then inserted into any two securing holes 127, which are through both the lower rotation plate 34 and the securing means plate 206 to secure the securing means plate 206 to the bottom 61 of the control assembly 12. In the preferred embodiment of the present invention, the 90 degree rotation of the rotating control assembly 12 for attachment purposes is accomplished by the same hydraulic cylinder 50 that rotates the present control assembly 12 plus or minus 180 degrees to position the blade assembly 22 in a forward facing position relative to the brush 80 to be cut, but it is within the spirit and scope of the present invention to accomplish this 90 or 180 or more degree rotation by any similar means.

It can be seen from the foregoing that all the objects and advantages have been accomplished by the present control assembly for a brush cutting machine. A control assembly has been provided which rotates the blade assembly of the machine so that it is forward facing into the material to be cut for an improved cut with less time and more efficient use of the cutting machine. An adjusting means has been provided for adjusting the vertical movement of the blade assembly relative to the ground for an improved cut and less stress on the cutting machine and the operator. A center mounting member has been provided for mounting the control assembly to the center of the top of the blade assembly for efficient control of the movement of the blade assembly and for moving the blade assembly lightly over rocks and debris with less stress on the cutting machine and the operator. A combination angling and attaching means is provided to attach the rotating means and the adjusting means together and to swivel and angle the control assembly and hence the blade assembly relative to the ground. A quick attachment means has been provided for attaching a variety of blade assemblies to the dipper boom in a quick and efficient manner.

Having described my invention I claim:

1. A control assembly for controlling the movement of a blade assembly of a cutting machine, the blade assembly having a center portion and a cutting portion, the blade assembly being used to cut brush on the ground, comprising:

rotating means having a top and a bottom, the top having an upper surface and a lower surface, the top of the rotating means being releasibly attached to a boom, the bottom having an upper surface and a lower surface, the bottom of the rotating means being attached at its upper surface to the top of the rotating means and at its lower surface to the blade assembly, the top and bottom of the rotating means being caused to rotate together by a control means, the rotating means rotating in response to and together with the top of the rotating means, the bottom of the rotating means in turn causing the blade assembly to rotate; and whereby the rotating means rotates the blade assembly relative to the boom so that the cutting portion of the blade assembly faces forwardly into the material to be cut.

2. A control assembly as defined in claim 1 further comprising:

adjusting means positioned between the top and bottom of the rotating means for adjusting the vertical movement of the control assembly to thereby adjust the vertical movement of the blade assembly relative to the ground.

3. The control assembly as defined in claim 2 further comprising:

a combination angling and attaching means for swiveling the control assembly to thereby adjust the angle of the blade assembly relative to the ground and for attaching the control assembly to the brush cutting machine.

4. The control assembly as defined in claim 1 further comprising:

a center mounting member for mounting the control assembly over the center of the blade assembly.

5. The control assembly as defined in claim 2 wherein the adjusting means comprises:

a plurality of coil springs adjustable on a vertical plane around an entire 360 degree circumferencial path of the blade assembly.

6. The control assembly as defined in claim 5 wherein the rotating means rotates the blade assembly at 360 or less degrees relative to the boom forming a 360 degree circumferencial path of the blade assembly.

7. The control assembly of claim 1 further comprising:

releasible attachment means having a top and a bottom, the bottom of the attachment means being fixedly attached to the upper surface of the blade assembly, the top of the attachment means being releasibly attached to the bottom of the rotating means.

8. The control assembly as defined in claim 7 wherein the bottom of the attachment means further comprises a securing means having a plurality of holes therein fixedly attached to the upper surface of the blade assembly and wherein the attachment means further comprises:

a mating securing receiver integral with the lower surface of the bottom of the rotating means; and whereby the lower surface of the bottom of the rotating means is attached to the blade assembly by rotating the rotating means in locking arrangement with the bottom of the attachment means.

9. The control assembly as defined in claim 8 wherein the securing means comprises two straight sides which mate with two pre-determined corresponding lines on the bottom of the rotating means; and whereby the lower surface of the bottom of the rotating means is attached to the blade assembly by rotating the rotating means to thereby line up the two pre-determined straight lines on the bottom of the rotating means with the two straight sides of the securing means.

10. The control assembly as defined in claim 8 wherein the attachment means further comprises:

at least one attaching bolt; and whereby the attachment means attaches the distal end of the boom to the upper surface of the top of the rotating means by securing at least one of the attaching bolts through one of the holes in the top of the attachment means.

11. The control assembly as defined in claim 1 Wherein the control means is a hydraulic cylinder system.

12. A method for controlling the movement of a blade assembly of a cutting machine with a control assembly, the blade assembly having a center portion and a cutting portion, the blade assembly being used to cut material on the ground comprising the steps of:

a) providing a rotating means, the rotating means having a top and bottom, the top of the rotating means being releasibly attached to the boom, the bottom of the rotating means being attached at a first side to the top of the rotating means and at a second side to the blade assembly;

b) rotating the control assembly with the rotating means, the top of the rotating means being caused to rotate by a control means, the bottom of the rotating means rotating in response to and together with the top of the rotating means, the bottom of the rotating means in turn causing the blade assembly to rotate; and whereby the blade assembly is rotated by the rotating means so that the cutting portion of the blade assembly faces forwardly into the material to be cut.

13. The method for controlling the movement of a blade assembly of a cutting machine with the control assembly as defined in claim 12 further comprising the steps of:

a) providing an adjusting means positioned between the top and bottom of the rotating means; and b) adjusting the vertical movement of the control assembly to thereby adjust the vertical movement of the blade assembly relative to the ground.

14. The method for controlling the movement of a blade assembly of a cutting machine using the control assembly as defined in claim 13 further comprising the steps of:

providing a combination angling and attaching means for swiveling the control assembly to thereby adjust the angle of the blade assembly relative to the ground and for attaching the control assembly to the brush cutting machine.

15. The method for controlling the movement of a blade assembly with the control assembly as defined in claim 12 further comprising the step of:

c) providing a center mounting member for mounting the control assembly over the center of the blade assembly.

16. The method for controlling the movement of a blade assembly of a cutting machine using the control assembly as defined in claim 13 further comprising the steps of:

c) providing the adjusting means comprising a plurality of coil springs.

17. The method for controlling the movement of a blade assembly of a cutting machine using the control assembly as defined in claim 12 further comprising the steps of:

c) providing a releasable attachment means having a first lower surface and a second upper surface;

d) releasibly attaching the first lower surface to the top of the blade assembly using the releasable attachment means; and e) releasibly attaching the second upper surface to the bottom of the rotating means.

18. The method for controlling the movement of a blade assembly of a cutting machine using the control assembly as defined in claim 16 further comprising the steps of:

d) providing a mating attaching receiver integral with the lower surface of the bottom of the rotating means; and whereby the lower surface of the bottom of the rotating means is attached to the blade assembly by rotating the rotating means in locking arrangement with the top of the attachment means.

19. The method for controlling the movement of a blade assembly of a cutting machine using the control assembly as defined in claim 16 further comprising the steps of:

d) providing at least one attaching bolt;

e) providing two straight sides positioned on the releasable attachment means which line up with two predetermined straight lines on the bottom of the rotating means; and whereby the bottom of the rotating means is rotated to lock the attaching means to the bottom of the rotating means and secured by at least one attaching bolt.

20. The method for controlling the movement of a blade assembly of a cutting machine using the control assembly as defined in claim 18 further comprising the steps of:

e) providing at least one attaching bolt; and whereby the attachment means attaches the distal end of the boom to the upper surface of the top of the rotating means by securing at least one of the attaching bolts through one of the holes in the top of the attachment means.

* * * * *